United States Patent
Murray et al.

(10) Patent No.: US 6,830,796 B2
(45) Date of Patent: Dec. 14, 2004

(54) ACOUSTIC BOARD WITH AN IMPROVED COMPOSITE STRUCTURE

(75) Inventors: Paul Murray, Venegono Superiore (IT); Massimo Battini, Varese (IT)

(73) Assignee: Aermacchi S.p.A., Venegono Superiore-Varese (IT)

( * ) Notice: Subject to any disclaimer, the term of this patent is extended or adjusted under 35 U.S.C. 154(b) by 5 days.

(21) Appl. No.: 10/043,551

(22) Filed: Jan. 11, 2002

(65) Prior Publication Data

US 2002/0094412 A1 Jul. 18, 2002

(30) Foreign Application Priority Data

Jan. 17, 2001 (IT) ..................................... MI2001A0078

(51) Int. Cl.[7] ................................................. B32B 3/12
(52) U.S. Cl. ........................ 428/73; 428/116; 428/131; 181/288; 181/292; 181/294; 52/793.1
(58) Field of Search ................................. 428/116, 131, 428/73; 181/288, 292, 294, 284; 52/793.1

(56) References Cited

U.S. PATENT DOCUMENTS

| | | | | |
|---|---|---|---|---|
| 4,300,978 | A | * | 11/1981 | Whitemore et al. |
| 6,176,964 | B1 | * | 1/2001 | Parente et al. |
| 6,371,242 | B1 | * | 4/2002 | Wilson et al. |
| 6,439,340 | B1 | * | 8/2002 | Shirvan |

* cited by examiner

*Primary Examiner*—Deborah Jones
*Assistant Examiner*—Wendy Boss
(74) *Attorney, Agent, or Firm*—Hedman & Costigan, P.C.

(57) ABSTRACT

An acoustic board with an improved composite structure (1), suitable for reducing the sound of aircraft engines, wherein an upper layer consists of a fabric (7) having a high sensitivity to sound velocity and a supporting sheet (4) having a certain porosity; the upper layer is combined, in turn, with an intermediate honeycomb layer (2) and with a lower layer (5) of the conventional type.

4 Claims, 1 Drawing Sheet

ACOUSTIC BOARD WITH AN IMPROVED COMPOSITE STRUCTURE

The present invention relates to an acoustic board with an improved composite structure, suitable for reducing the sound produced by aircrafts with jet engines.

The nacelles assembled on aeroplanes with jet engines have absorbing linings, called acoustic boards, for reducing the sound produced by the engine itself.

These acoustic boards are designed to provide acoustic impedance to the sound produced.

In particular, the value of this impedance should be as close as possible to that necessary for obtaining maximum attenuation.

This optimum impedance value varies in relation to the sound spectrum emitted and the operating conditions of the engine.

The acoustic boards currently used usually comprise a prevalently resistive sheet made of porous material, or upper sheet, attached to a honeycomb structure, in turn attached, at the opposite side, to a sound-reflecting sheet, or lower sheet.

Other variations to the embodiment described may contain additional layers of resistive material interposed with honeycomb structures.

The upper sheets, furthermore, can be of the perforated or (acoustically) linear type.

The perforated sheets consist of layers of material having a regular perforation with holes having a specific diameter and uniformly distanced, so as to obtain the desired porosity. The acoustic resistance of this type of material shows a high sensitivity to the local sound velocity of the particles. For these boards, the local sound velocity of the particles depends on the level of acoustic pressure and on the Mach number of the air flow which brushes against the board.

The so-called "linear" sheets consist of layers of fabric, whose porosity produces an acoustic resistance which has a minimum variation in relation to the sound velocity.

The layer of fabric, which can be of any material, is attached to a supporting sheet which can be produced with various metallic and non-metallic materials.

It is difficult, however, to obtain an acoustic resistance which forms the best compromise for all operating conditions of the engine.

An objective of the present invention is therefore to overcome the disadvantages mentioned above and, in particular, to propose an acoustic board with an improved composite structure, which has a more efficient sound attenuation.

Another objective of the present invention is to propose an acoustic board with an improved composite structure, which allows the acoustic resistance to be adequately evaluated and controlled in relation to the sound pressure.

A further objective of the present invention is to produce an acoustic board with an improved composite structure, which maintains an adequate structural integrity also under severe functioning conditions.

These and other objectives are achieved by an acoustic board with an improved composite structure, according to claim 1, to which reference should be made for the sake of brevity.

The invention advantageously proposes to describe an acoustic board, suitable for reducing the sound of aircraft engines, having desired nominal resistance values and variability values thereof, with the sound velocity and sound pressure level.

This type of board can therefore be used to obtain an improved adaptation to the optimum characteristics defined for all functioning conditions of the engine.

Further objectives and advantages of the present invention are evident from the following description and enclosed drawings, provided for purely illustrative and non-limiting purposes, wherein.

Figure 1:
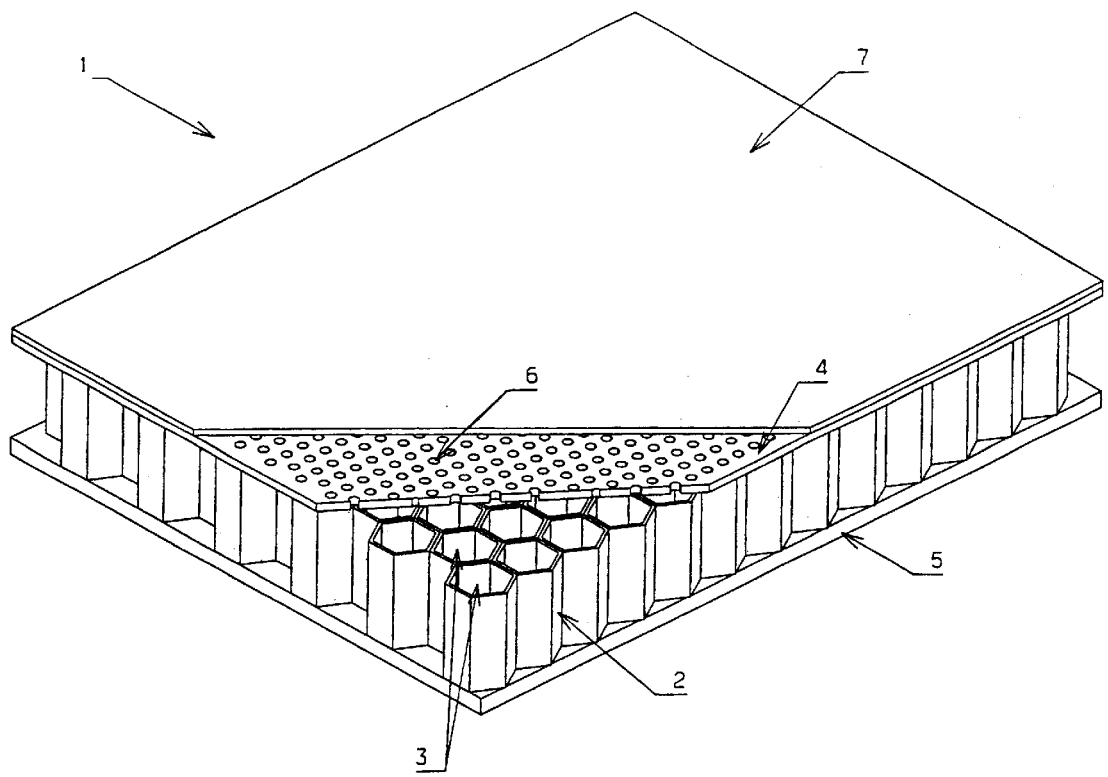
FIG. 1 is a partial isometric view of an acoustic board with an improved composite structure, according to the present invention.
Figure 2:
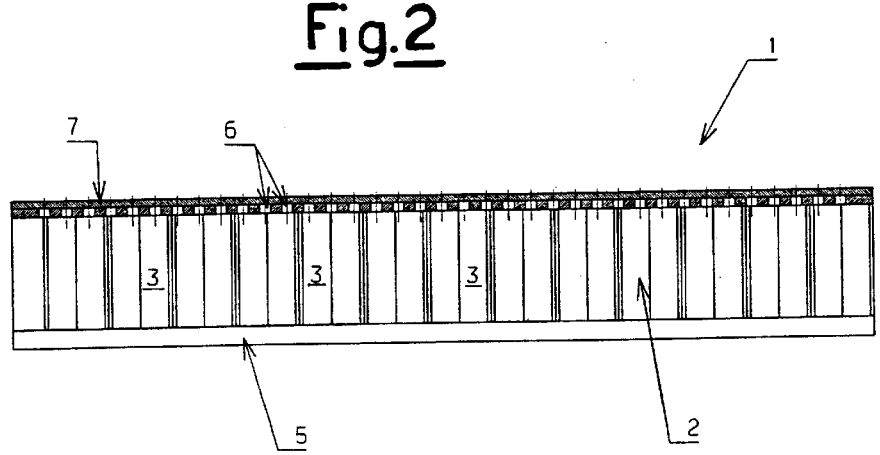
FIG. 2 is a partial vertical section of the acoustic board with an improved composite structure as per FIG. 1, according to the present invention.

With reference to the above figures, the overall structure of the improved acoustic board, according to the present invention, comprises at least one intermediate honeycomb layer, indicated with 2, which has a standard arrangement of multiple cells 3, all adjacent to each other, an upper layer or sheet 4, which has a series of holes 6 having a substantially constant and pre-established diameter, and a layer or sheet of fabric 7, covering the upper perforated sheet 4.

The layer of fabric 7 can consist of metallic fibres (e.g. steel) or another material or a mixture of fibrous materials such as graphite, nylon or others.

The supporting sheet 4 provides the structure 1 with compactness and resistance and influences the acoustic properties of the board.

The material of which the intermediate layer 2, the upper layers 4, 7 and the lower layer 5, when the structure 1 is subjected to use under critical functioning conditions (such as those prevailing in the use of acoustic boards for nacelles of aircrafts with jet engines) are preferably made, is generally an aluminum alloy, due to its excellent mechanical characteristics, in particular, the ratio between the structural resistance and/or weight; other materials, however, and/or other materials suitably selected on the basis of their physical and mechanical characteristics, can also be used.

The intermediate honeycomb layer 2 can be made of phenolic resin, plastic material, paper, Kevlar® or other materials having the same or similar physical and mechanical properties.

The supporting perforated layer or sheet 4 contains a series of holes 3, which are spaced according to a pre-established arrangement, thus allowing the desired POA (percentage of open area) to be obtained.

The lower sheet or layer has the double function of an acoustically sound-reflecting surface and structural component of the sandwich board. The above structure 1 functions according to Helmholtz's resonant cavity principle.

The layer of fabric 7 is laid and attached, by means of a fine adhesive layer, to the upper surface of the supporting sheet 4, whereas the lower layer 5 is attached to the lower surface of the honeycomb layer 2.

In the structure 1 of the acoustic board according to the invention, the upper layer 4, 7 is modified so as to obtain a nominal value of the local sound velocity resistance and a dependency on the latter of the linear type and of the desired entity.

For this purpose, the upper layer 7 of the conventional type, i.e., as already mentioned, consisting of a fabric having a resistance which is only slightly variable with the sound velocity and constrained to the supporting sheet 4 having a high porosity, is modified by substituting the fabric with a different type of material, having a greater sensitivity to the local sound velocity. The supporting sheet 4 can also be substituted with a sheet having the same or a lower porosity with respect to the known art.

By appropriately selecting the characteristics of the layer of fabric 7 and supporting sheet 4, it is possible to obtain a desired nominal sound velocity resistance value and a variation value of said resistance with the velocity itself.

In practice, a fabric 7 having a given nominal resistance and known resistance variation with the sound velocity is attached to a supporting sheet 4, which can be made of any suitable material, having a pre-established porosity.

The combination of the two layers 4 and 7 forms an upper layer having the desired nominal resistance characteristics and variation thereof with the SPL (sound pressure level). With the latter combination of said upper layer with the intermediate honeycomb layer 2 and the lower layer 5, of the conventional type, there is the possibility of obtaining an acoustic board structure 1 having optimum characteristics for all operating conditions of the engine and consequently an overall improved sound attenuation, with respect to the acoustic board structures belonging to the known art.

The optimum characteristics for all operating conditions of the engine and consequently an overall improved sound attenuation, with respect to the acoustic board structures belonging to the known art, appear evident from the description.

Finally, numerous variations can obviously be applied to the acoustic board, according to the invention, without excluding any of the novelty principles which characterize the inventive idea illustrated, and it is also evident that, in the embodiment of the invention, the materials, forms and dimensions of the details illustrated can vary according to the demands and can be substituted with other technically equivalent alternatives.

What is claimed is:

1. An acoustic board having an improved composite structure (1), suitable for reducing the sound of aircraft engines, which consists essentially of an outer upper layer, consisting of a fabric (7), made of a material selected from the group consisting of metallic fibers, graphite and nylon having nominal resistance and a high sensitivity to sound particle velocity, said outer upper layer being disposed over a lower perforated supporting sheet (4) having higher porosity than said outer upper layer, said lower perforated supporting sheet (4) having an upper surface and a lower surface, said supporting sheet (4) being attached at its upper surface to said fabric (7) and at its lower surface to an intermediate honeycomb layer said intermediate honeycomb layer being closed by a lower layer (5) for the structure (1).

2. The acoustic board according to claim 1, wherein that said supporting sheet (4) comprises a series of apertures (6) which produce a percentage of open area.

3. The acoustic board according to claim 1, wherein the honeycomb intermediate layers (2) are made of a material selected from the group consisting of phenolic resin, plastic material, paper, and aramid.

4. The acoustic board according to claim 1, wherein the layer of fabric is attached, by means of an adhesive layer, to the upper surface of said supporting sheet (4) and said lower layer (5) is attached to said intermediate honeycomb layer (2).

* * * * *